United States Patent
Candelora et al.

(10) Patent No.: US 7,137,751 B2
(45) Date of Patent: Nov. 21, 2006

(54) WRITING INSTRUMENT WITH CUSHIONING ELEMENT

(75) Inventors: Andrew Candelora, East Haven, CT (US); Richard O'Brien, Oxford, CT (US)

(73) Assignee: Societe BIC S.A., Clichy (FR)

( * ) Notice: Subject to any disclaimer, the term of this patent is extended or adjusted under 35 U.S.C. 154(b) by 226 days.

(21) Appl. No.: 10/800,402

(22) Filed: Mar. 11, 2004

(65) Prior Publication Data

US 2004/0234322 A1    Nov. 25, 2004

Related U.S. Application Data

(63) Continuation-in-part of application No. 10/389,300, filed on Mar. 14, 2003, now abandoned.

(51) Int. Cl.
*B43K 5/16* (2006.01)
*B43K 21/02* (2006.01)

(52) U.S. Cl. ............... 401/103; 401/54; 401/251

(58) Field of Classification Search ............ 401/54, 401/103, 235, 251, 259; 249/59, 142, 176, 249/184
See application file for complete search history.

(56) References Cited

U.S. PATENT DOCUMENTS

| | | |
|---|---|---|
| 1,041,926 A | 10/1912 | Werner |
| 1,340,331 A | 5/1920 | Fischer |
| 1,508,170 A | 9/1924 | D'Olier |
| 1,769,572 A | 7/1930 | Grosz |
| 1,780,405 A | 11/1930 | Sharrow |
| 2,055,316 A | 11/1936 | Sharrow |
| 2,128,456 A | 8/1938 | Dusenbury, Sr. |
| 2,162,914 A | 6/1939 | Feather |
| 2,362,582 A | 11/1944 | Pearson |
| 2,488,179 A | 11/1949 | Engel, Jr. |
| 2,946,311 A | 7/1960 | Craig |
| 3,419,336 A | 12/1968 | Kirk |
| 4,728,474 A | 3/1988 | Beal |
| 5,009,533 A | 4/1991 | Kageyama |
| 5,122,052 A | 6/1992 | Trame et al. |
| 5,294,206 A | 3/1994 | Mukunoki |
| 5,415,487 A | 5/1995 | Rukan et al. |
| 5,915,870 A | 6/1999 | Hamilton, Jr. |
| 6,086,276 A | 7/2000 | Gueret |
| 6,126,350 A | 10/2000 | Kageyama et al. |
| 6,257,787 B1 | 7/2001 | Kirk |
| 6,261,015 B1 | 7/2001 | McCauley et al. |
| 6,340,258 B1 | 1/2002 | Gueret |

FOREIGN PATENT DOCUMENTS

DE    41 01 635 A1    7/1992

*Primary Examiner*—David J. Walczak
(74) *Attorney, Agent, or Firm*—Jones Day (57) ABSTRACT

A writing instrument having a writing tip that responds to pressure applied during writing through the use of a cushioning element integrally formed with another part of the writing instrument. In a preferred embodiment, a writing instrument comprises a barrel, a cartridge with a writing tip, and an end plug with a cushioning element formed integrally with the end plug. The cartridge may be held in the barrel via the cushioning element, which is attached to the proximal end of the barrel. The end plug may be formed by an injection molding process. A stop element may be provided to inhibit or to prevent compression of the cushioning element after a predetermined degree of compression of cushioning element. The cushioning element may have a variable spring rate.

16 Claims, 9 Drawing Sheets

WRITING INSTRUMENT WITH CUSHIONING ELEMENT

CROSS-REFERENCE TO RELATED APPLICATION

The present application is a continuation-in-part of U.S. patent application Ser. No. 10/389,300, filed Mar. 14, 2004, which is now abandoned.

FIELD OF THE INVENTION

The present invention relates to a writing instrument with a cushioning element. More particularly, the present invention relates to a cushioning element at the back, non-writing end of a writing instrument which allows the writing tip of the writing instrument to react to force applied to the tip of the writing instrument during writing, thereby providing a certain feeling to the user while writing.

BACKGROUND OF THE INVENTION

In general, writing instruments such as pens have a main body into which a cartridge with a writing tip is held in place such that a user may write with the writing instrument. For most writing instruments, the writing tip is held in substantially rigid relation to the rest of the instrument during writing. However, in some cases a cushioning element, such as a spring or other biasing element, holds the cartridge and thus the writing tip in the writing instrument in a non-rigid manner. The cushioning element allows the writing tip to be biased into the main body of the instrument when force is applied to the writing tip during writing. This provides a certain feel to the user during writing that many find desirable.

The use of cushioning elements has been well known in the prior art. For instance, spring elements have been used to provide cushioning to the writing tip. Other elements, such as foam inserts, can also be found in the prior art. However, all of the cushioning elements in the prior art are elements separate from the rest of the writing instrument. Thus, the separately formed cushioning element must be attached or coupled to the other parts of the writing instrument, increasing the complexity of manufacturing and/or assembling of the writing instrument. Also, the addition of another element to the writing instrument increases the likelihood of some failure in the attachment of the elements of the writing instrument to each other, reducing the overall reliability of the writing instrument.

Thus, there remains a need for a writing instrument with a cushioning element for the writing tip that is formed for ready assembly with the writing instrument and that is easy to manufacture.

In addition, resilient elements may be prone to wear or to reduced efficacy upon repeated usage or upon overuse or abuse. For instance, a cushioning element for writing tip of a writing instrument may lose its resiliency after repeated use over over-compression. If used in excess, or abused, the cushioning element can flatten out or take a set or otherwise lose efficacy. It therefore would be desirable to reduce such risk of loss of efficacy of a cushioning element.

SUMMARY OF THE INVENTION

One aspect of the present invention provides a writing instrument with a cushioning device formed integral with another element of the writing instrument. The writing instrument has a barrel, a cartridge with a writing tip, and an end plug. A cushioning element in one embodiment is formed integrally with a part of the instrument, such as the end plug. In an exemplary embodiment, the cushioning element is a spring element. The cartridge may be held in place in the barrel of the writing instrument via the cushioning element, which is coupled to the proximal end of the barrel. The cushioning element biases the writing tip in an axial direction out of the barrel and allows the writing tip to be axially displaceable into the body of the writing instrument when force is applied to the writing tip during writing or marking. This promotes a certain feel to the user that is transmitted during writing. Furthermore, the cushioning element preferably is configured to allow the end plug to be formed by an injection molding process.

The present invention provides a writing instrument with a cushioning element formed integral with another element of the writing instrument. This is distinguished from the prior art, which required subsequent assembly or attachment of a cushioning element with another element of a writing instrument after both elements had been fully formed. In the writing instrument of the present invention, the cushioning element and the element to which it is formed integral with are inseparable and act as one element once the formation process of the elements is complete, requiring no further assembly or attachment to each other before use in the writing instrument.

According to another aspect of the present invention, that may be independent of the above-described aspect of the present invention or may be applied in combination with the above-described aspect of the present invention, the cushioning element may be formed to have varying spring rates. It will be appreciated that if the cushioning element is in the form of a coil spring, a variable spring rate may be provided by forming the coil spring itself to have a variable spring rate. For instance, the distance between the coils of the coil spring may vary so that coils bottom out successively. Each time a coil bottoms out, the spring rate of the spring increases.

In accordance with yet another aspect of the present invention that may be applied with any or all of the above-described aspects of the present invention, a stop element may be provided to limit the compression of the cushioning element. For example, if the cushioning element is in the form of a coil spring, the stop element may be in the form of a stop pin extending axially within and through the coil spring. The stop pin is shorter than the length of the coil spring such that the coil spring may compress freely without being impeded by the stop pin up to a predetermined degree of compression. Once such predetermined degree of compression is reached, the stop pin inhibits or prevents further compression of the spring.

It will be appreciated that the above-described aspects of the present invention may be applied singly or in combination. For instance, the cushioning element may be a coil spring and the stop element may be in the form of a stop pin provided within and through the coil spring. The stop pin may be somewhat or moderately resilient or elastic to permit further compression of the spring, but at a higher spring rate. Accordingly, the coil spring in combination with the stop pin form a cushioning element with a variable spring rate.

BRIEF DESCRIPTION OF THE DRAWINGS

The detailed description will be better understood in conjunction with the accompanying drawings, wherein like reference characters represent like elements, as follows.

DETAILED DESCRIPTION OF THE INVENTION

Turning to FIGS. 1 to 5, an embodiment of a writing instrument 10 constructed in accordance with the principles of the present invention is shown with the understanding that those of ordinary skill in the art will recognize many modifications and substitutions which may be made to various elements thereof. It will be appreciated that the term "writing" is used herein for the sake of simplicity. However, it is to be understood that this is not intended to limit the scope of the invention. The terms "writing" or "marking" are not limited to writing and marking in their literal sense but, instead should be understood to include application of other mediums or substrates such as glue or correction fluid.

Figure 1:
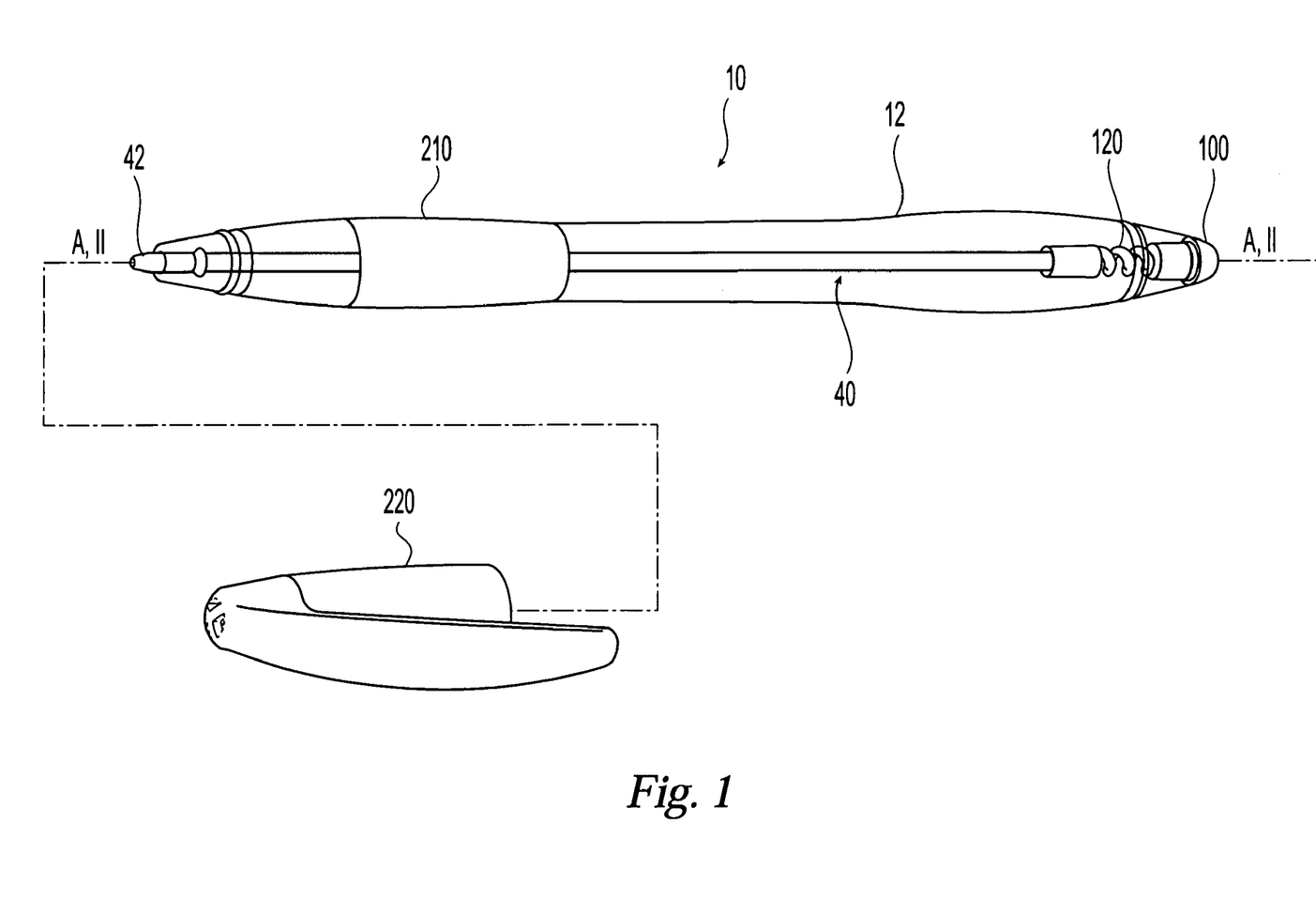
FIG. 1 is a perspective exploded view an exemplary embodiment of a writing instrument formed in accordance with the principles of the present invention.
Figure 2:
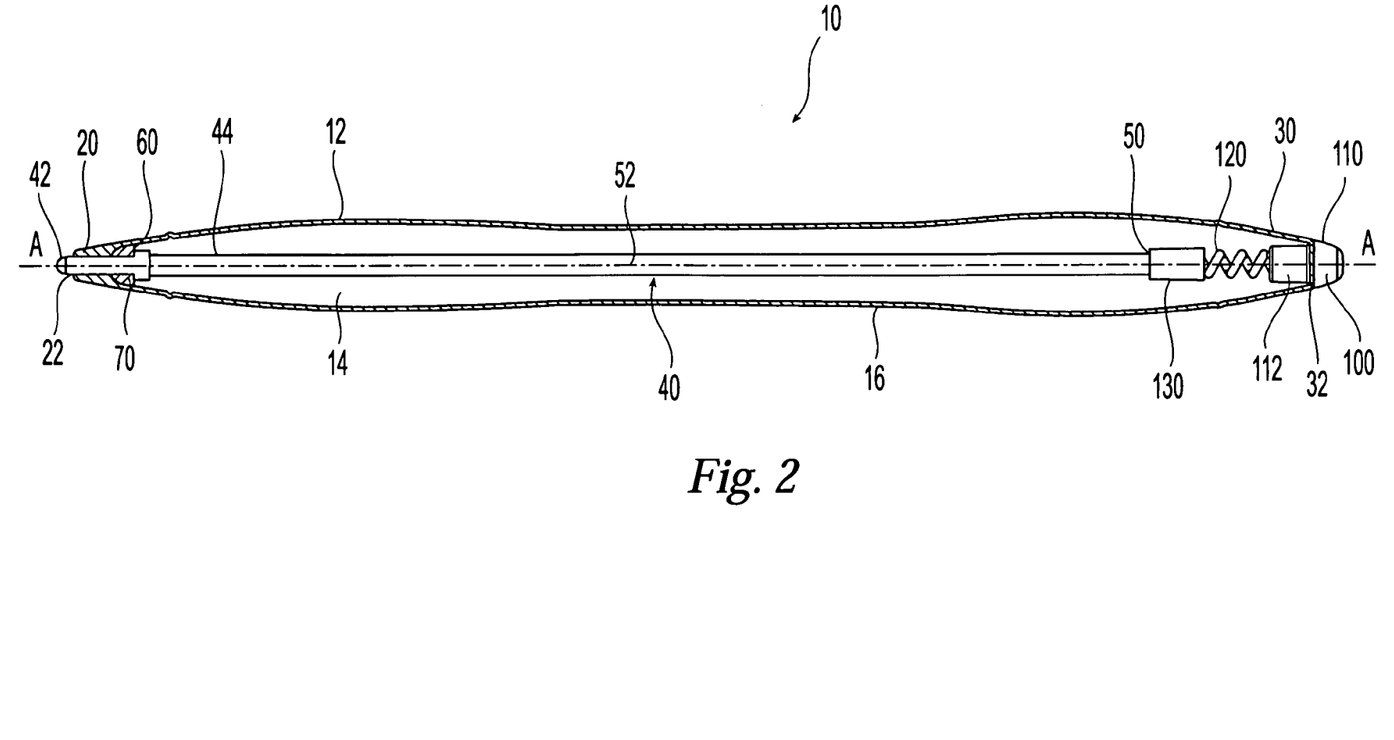
FIG. 2 is a cross-sectional view of the writing instrument of FIG. 1 along line II—II.

As shown in FIGS. 1 and 2, writing instrument 10 generally comprises a plurality of components, such as barrel 12, cartridge 40, end plug 100, and longitudinal axis A—A. Cartridge 40 is insertable into barrel 12 and may be held within barrel 12 via end plug 100. End plug 100 may be permanently bonded to barrel 12 or releasably attached so that a replacement cartridge 40 may be inserted into barrel member 12 when the writing medium therein is depleted (as discussed in further detail below).

Cartridge element 40 comprises writing tip 42, main body 44, and proximal, non-writing end 50. Writing tip 42 may be in any desired form, such as a roller ball, ballpoint, or nib (e.g., felt or fountain pen). Main body 44 further comprises writing medium reservoir 52, which may carry writing medium directly or in a fibrous wad or tampon. Other types of writing tips and writing mediums can be used without departing from the spirit and scope of the present invention. For instance, writing instrument 10 may use lead or highlighting fluid as a writing medium. Proximal end 50 may be provided with opening 54 to allow venting for writing medium reservoir 52, to allow proper operation of cartridge 40 during writing for select types of writing mediums. However, a cartridge not requiring venting, such as a pressurized cartridge, may be used instead.

Barrel 12 is generally elongated and cylindrical in shape. Barrel 12 further comprises distal writing end 20, proximal non-writing end 30, and cavity 14. Cavity 14 is configured to accept cartridge 40. Distal end 20 has opening 22 configured to allow writing tip 42 of cartridge 40 to protrude from barrel 12. Proximal end 30 has opening 32 configured to accept end plug 100. In a preferred embodiment, the diameter of writing tip 42 is smaller than that of main body 44 of cartridge 40 and forms a shoulder 60. Projections 70 are formed in barrel 12 adjacent and proximal to distal end opening 22, against which shoulder 60 of cartridge 40 may abut, as further described below.

Figure 3:
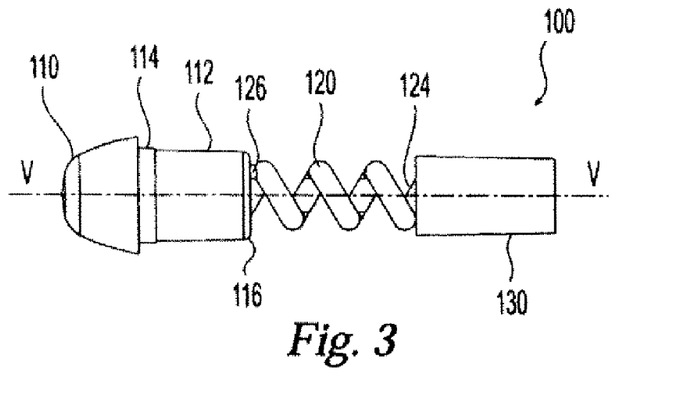
FIGS. 3 and 3a are elevational views of an end plug formed in accordance with the principles of the present invention.
Figure 3A:
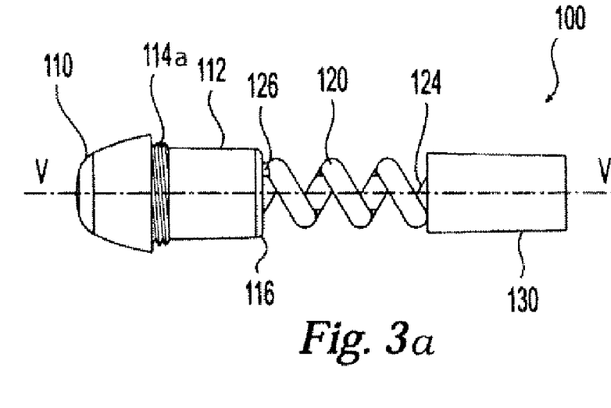
Figure 4:
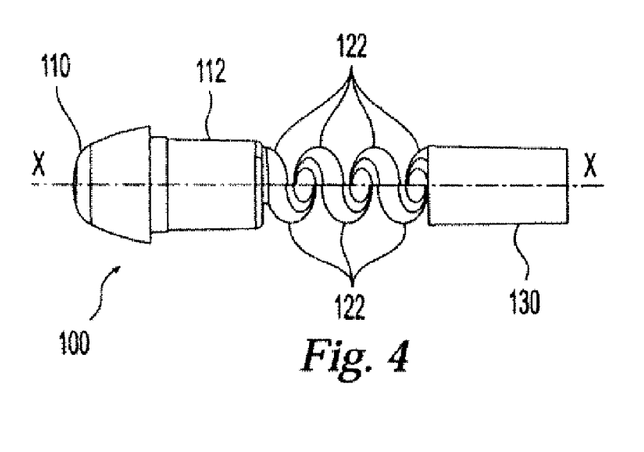
FIG. 4 is an elevational view of the end plug of FIG. 3 rotated 90°.
Figure 5:
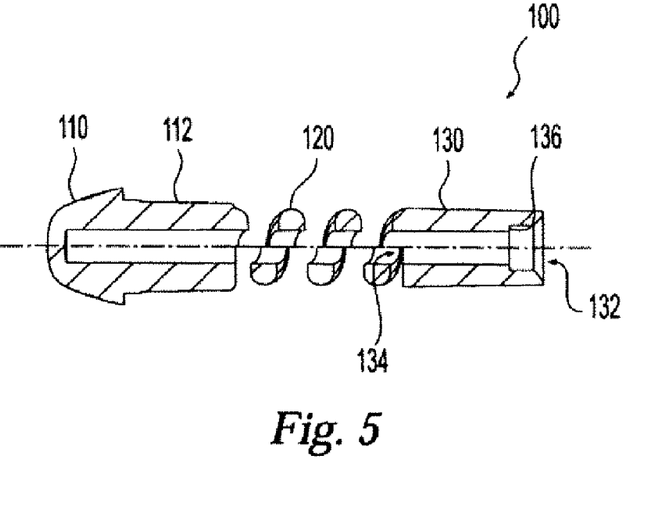
FIG. 5 is a cross-sectional view of the end plug of FIG. 3 along line V—V.

As shown in FIGS. 3 to 5, end plug 100 has an outer end cap 110 and an inner section 112. Inner section 112 is configured to fit inside barrel 12 and preferably is also configured to interact with proximal end opening 32 of barrel 12. Outer end cap 110 may be shaped and dimensioned to match the outer contour 16 of barrel 12 and to enhance further the outer visual appearance of writing instrument 10. An interference band 114 or threads 114a may be provided encircling end plug 110 where inner section 112 meets outer end cap 110.

In the embodiment of FIGS. 3–5, end plug 100 is formed integrally with cushioning element 120. A collar 130 may be integrally formed with cushioning element 120. In a preferred embodiment, end plug 100, cushioning element 120, and collar 130 (if provided) are formed as a single piece. Collar 130 is formed integrally with distal end 124 of cushioning element 120, and proximal end 126 of cushioning element 120 is formed integrally with distal end 116 of inner section 112. Collar 130 may be annular in shape, preferably having distal aperture 132 configured to accept proximal end 30 of cartridge 40. Cartridge 40 may then be coupled to and held by end plug 100 and thereby be stabilized within barrel 12 against wobbling or movement transverse to the longitudinal axis A—A. In a preferred embodiment, collar 130 is formed with shoulder 136 against which proximal end 50 of cartridge 40 may abut such as to be stabilized.

As is well known in the art, some types of cartridges 40 require venting. In one embodiment, venting is accomplished through the space between writing tip 42 and distal writing end opening 22. Furthermore, a proximal aperture 134 may be provided in collar 130 to allow air to communicate with writing medium reservoir 52 through proximal end opening 54 of cartridge 40 (see FIG. 11), providing sufficient venting of writing medium reservoir 52. Other embodiments of the present invention may use alternative ways to provide venting, such as having openings in end plug 100 or in the side of barrel 12. Still other embodiments may not require venting, an example of which would be writing instruments which use pressurized cartridges.

In a preferred embodiment, writing instrument 10 is assembled by inserting cartridge 40 into barrel 12 through barrel proximal end opening 32, and inserting and attaching inner section 112 of end plug 100 in barrel proximal end opening 32. Proximal end 50 of cartridge 40 at least abuts cushioning element 120 or collar 130. Preferably, proximal end 50 of cartridge 40 is inserted into collar 130 through distal aperture 132 and thereby held by collar 130. If shoulder 136 is provided in aperture 132 of collar 130, proximal end 50 of cartridge 40 is inserted in aperture 132 to abut shoulder 136 to be thereby stabilized. In a preferred embodiment, end plug 100 and barrel 12 are fixed with respect to each other so that end plug 100 cannot be separated from barrel 12 and accidentally swallowed. Thus, end plug 100 and barrel 12 are preferably made of the same material, allowing them to be permanently welded together, such as by ultrasonic welding. Interference band 114 provides sufficient interference between inner section 112 and proximal end opening 32 such that an ultrasonic shear weld can be used to attach end plug 100 to barrel 12 permanently.

Other manners of assembling writing instrument 10 can be used without departing from the spirit and scope of the present invention. For example, instead of proximal end 50 of cartridge 40 being stabilized by abutting collar 130 in shoulder 136, cartridge 40 may be held by cushioning element 120 by a press-fitting, threaded, or adhesive attachment. Also, end plug 100 can be attached to barrel 12 by use of a face weld instead of a shear weld, or other attachment means such as press fitting, threading, or adhesives. Furthermore, the attachment of end plug 100 to barrel 12 can be permanent or end plug 100 can be attached releasably from barrel 12 (in which case the shape and configuration of end plug 100 is selected to not result in asphyxiation if swallowed).

Writing tip 42 movably extends through writing end 20 of barrel 12 for displacement in an axial direction along longitudinal axis A—A into barrel 12. This allows writing tip 42 to respond to forces exerted upon it when writing pressure is applied to and released from writing tip 42. In response to such forces, cushioning element 120 provides a biasing force in the opposing direction against writing tip 42 through cartridge 40, providing a certain feel to the user of the writing instrument 10. Distal end opening 22 is configured to allow minimum clearance between the walls of the opening 22 and writing tip 42 in order to prevent deflection of the writing tip 42 off the longitudinal axis A—A. Furthermore, because cartridge proximal end 50 preferably is inserted into collar 130, deflection or wobbling of cartridge 40 (movement transverse to longitudinal axis A—A) is further prevented.

Preferably, writing instrument 10 is assembled such that there is a small preload on cushioning element 120 so that shoulder 60 of cartridge 40 constantly presses against projections 70 of barrel 12. Therefore, even when the writing instrument 10 is not in use, cushioning element 120 provides a biasing force on cartridge 40 and writing tip 42 in an axial directional along longitudinal axis A—A towards distal writing end 20. This helps to prevent the user from experiencing a feeling of looseness during use of writing instrument 10. Furthermore, this preload on cushioning element 120 ensures that cartridge 40 is constantly pressed against collar 130 (preferably shoulder 136), further ensuring that cartridge 40 does not become separated from collar 130.

Other embodiments of the present invention may allow the user to vary the amount of preload on cushioning element 120. For example, in a preferred embodiment, end plug 100 may be attached to barrel 12 via a threaded attachment, allowing the user to increase or decrease the amount of preload on cushioning element 120 by increasing or decreasing the amount that end plug 100 is inserted into barrel proximal end opening 32. The more that end plug 100 is inserted into barrel proximal end 32, the greater the compression cushioning element 120 experiences from projections 70 pressing against cartridge shoulder 60, due to the decreased distance between projections 70 and the distal end 124 of cushioning element 120.

In a preferred embodiment, cushioning element 120 may take the form of a spring. It is noted that the geometrical configuration of the cushioning element 120 depends upon the material used to form the cushioning element 120 and the desired spring rate. Once a material is selected and the flexural modulus of the material is determined, the geometry of cushioning element 120 can be configured so as to provide the desired spring rate (force/distance the spring is compressed) for cushioning element 120. Therefore, the actual flexural modulus of the material used to compose cushioning element 120 is not critical to the present invention. By increasing or decreasing the thickness and varying the cross-sectional shape and orientation of a spring coil, the spring rate can be controlled. The knowledge of how to configure cushioning element 120 to provide a desired spring rate is well known in the art. In a preferred embodiment, the stiffness of the material and the spring configuration of cushioning element 120 is selected to provide a spring rate of approximately 0.45 kg/mm. A spring rate of no less than about 0.10 kg/mm and/or no greater than 1 kg/mm is generally preferred. However, other spring rates can be used without departing from the spirit and scope of the present invention.

Figure 8:
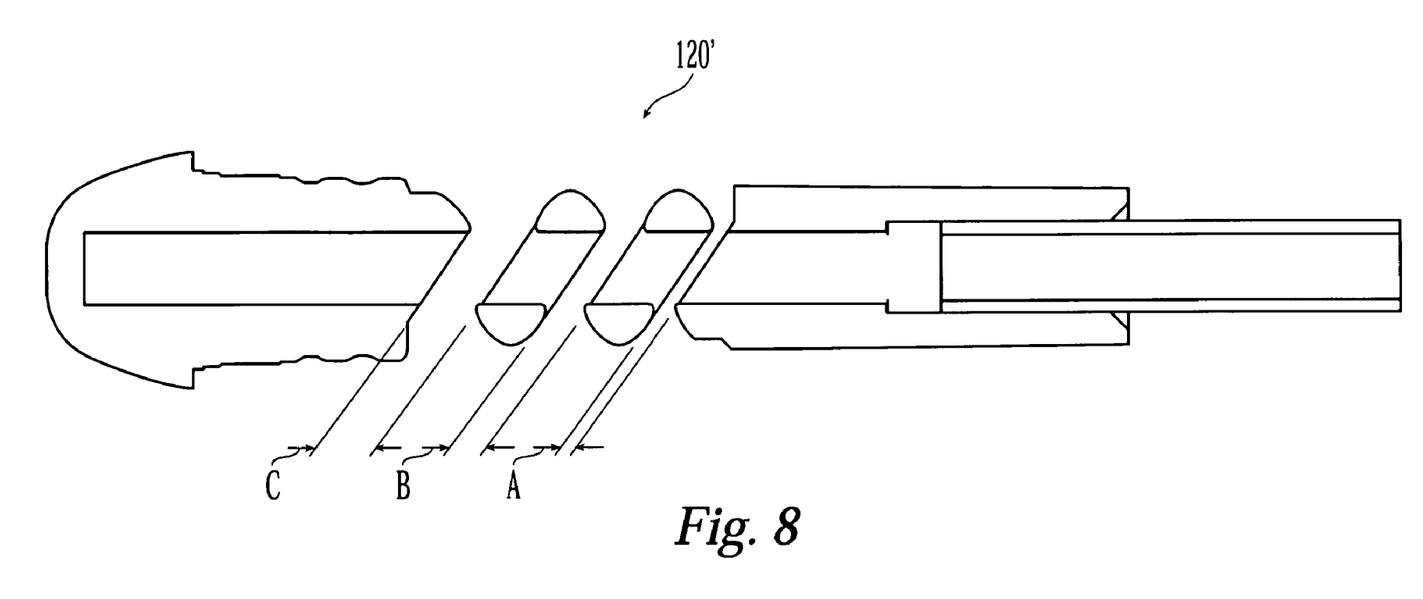
FIG. 8 is an elevational view of an exemplary cushioning element with a variable spring rate.

If desired, a cushioning element 120 in the form of a spring 120' may be further configured to have a variable spring rate, as illustrated in FIG. 8. Thus, the change in the spring rate as the user compresses cushioning element 120 increases in a non-linear manner (whereas a standard spring has a spring rate that increases in a generally linear manner). A variable spring rate may be achieved in any of a number of manners known to those of skill in the art. For instance, a coil spring with varying distances A, B, C between the adjacent coils thereof may provide a variable spring rate. As the spring is compressed, the coils sequentially bottom out, starting with the coils that are spaced closer together. Each time adjacent coils bottom out, the overall spring rate of the coil spring increases. Thus, as the user presses writing tip 42 against a substrate with increasing pressure, the spring provides increased resistance to the user's pressing force. Over-compression of the spring may thereby be inhibited or avoided. Moreover, the increase in pressure provides feedback to the user and may remind the user to apply less pressure to writing tip 42.

In one embodiment, barrel 12 is composed of a transparent material, allowing cushioning element 120 of end plug 100 to be seen. This enhances the visual effect of writing instrument 10.

In order to simplify manufacture as well as assembly and to reduce the number of moving parts, end plug 100 and cushioning element 120 may be formed integrally by an injection molding process. Cushioning element 120 of such embodiment, therefore, is configured so that it may be formed by an injection molding process, as described below.

Figure 6:
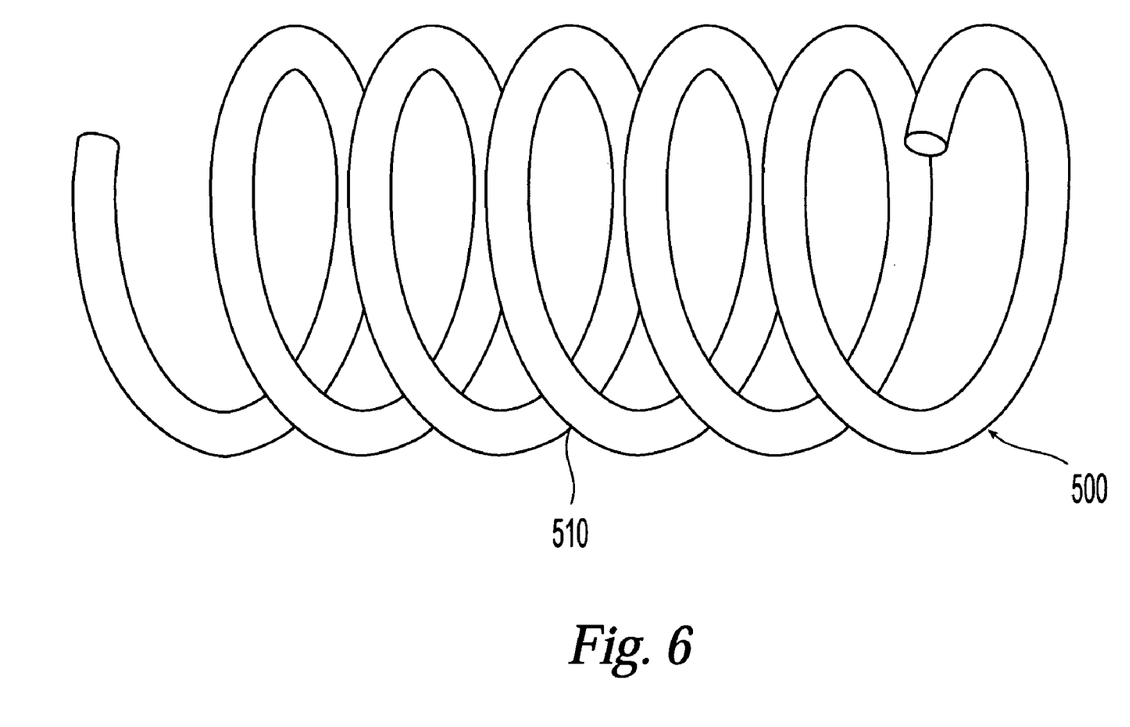
FIG. 6. is an elevational view of an exemplary helical coil spring.

It is well known in the art that it is extremely difficult to manufacture a true helical coil spring by injection molding. The contours formed are too complex and are not amenable to being formed in molds that separate along a mating plane. A true helical coil spring formed by injection molding generally is damaged as the spring is ejected from the mold because of the complexity of the shape. For example, as shown in FIG. 6, a helical coil spring 500 has undercuts 510. These undercuts 510 prevent a helical coil spring from being easily removed from an injection mold cavity.

Cushioning element 120 of a preferred embodiment of the present invention is formed so as to have no undercuts which would prevent cushioning element 120 from being removed from an injection mold. As seen in FIG. 4, a molded end plug 100 has a distinct parting plane X—X. Each half of cushioning element 120 along parting plane X—X is composed of spring segments 122, each spring segment 122 generally being in the shape of half of a torus, preferably with a "D"

shaped cross-section. As seen from a top view of cushioning element 120 (FIG. 3), there are no undercuts along spring segments 122, as there would be in a true helical coil spring. From a top view of cushioning element 120, this results in a zig-zag appearance for cushioning element 120.

Figure 7:
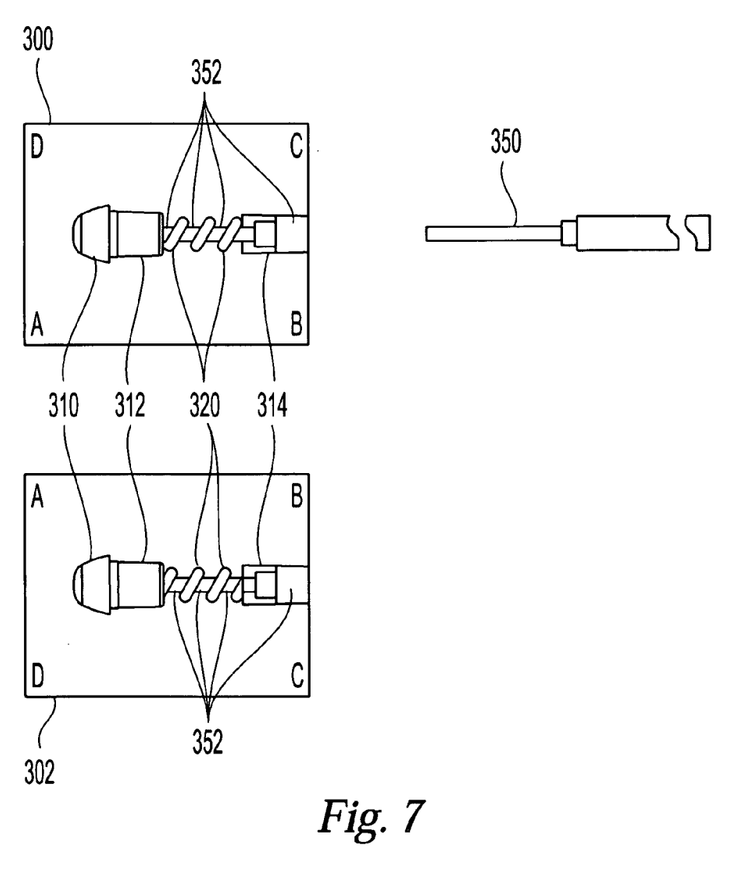
FIG. 7 is a plan view of exemplary mold sections usable in an injection-molding process for manufacturing an exemplary embodiment of a writing instrument formed in accordance with the principles of the present invention.

Exemplary molding equipment that may be used to form end plug 100 is illustrated in FIG. 7. The material from which end plug 100 with cushioning element 120 is formed may be injection molded into mold halves 300 and 302, as shown in FIG. 7. Each mold half 300, 302 has outer end cap cavity 310, inner section cavity 312, collar cavity 314 (if a collar is provided), and spring segment cavities 320. The spring segment cavities 320 of each mold half are not connected with one another. Mold halves 300 and 302 also have pin cavities 352 which allow pin 350 to be inserted between mold halves 300, 302 when mold halves 300 and 302 are mated together to maintain the desired internal configuration of end plug 100.

When mold halves 300 and 302 are mated, the respective outer end cap cavities 310, inner section cavities 312, and collar cavities 314 are lined up with one another, and the ends of each of the spring segment cavities 320 of first mold half 300 are lined up with the ends of two adjacent spring segment cavities 320 of second mold half 302. Pin 350 is inserted to define the apertures 132 and 134 and shoulder 136 in collar 130 and to define the inner portion of spring segments 122. Molten or at least flowable material is injected into the mold and cooled or hardened, depending upon the material used. Formed end plug 100 is then removed from the mold.

End plug 100 may be composed of SAN (Styrene Acrylonitrile), a thermoplastic polymer. However, many other materials, including other thermoplastics such as ABS, Styrene, Acetal, polycarbonate, or filled materials may also be used. Desirable characteristics of the material used in forming end plug 100 include the material's ability to be used in mass-production manufacturing methods, such as injection molding processes, as well as a relatively high flexural modulus, or stiffness. Preferably, the material possesses a flexural modulus above about 100,000 psi. It has been determined that materials having a flexural modulus below this amount are for practical purposes too pliant to be used to form cushioning element 120. Furthermore, while there is theoretically no upper limit to the flexural modulus that can be used, it is noted that a flexural modulus of about 500,000 psi is generally the upper limit found in most thermoplastic polymers.

Other manners of manufacturing end plug 100 include the use of stereographic lithography, or the machining of blank forms.

Figure 9:
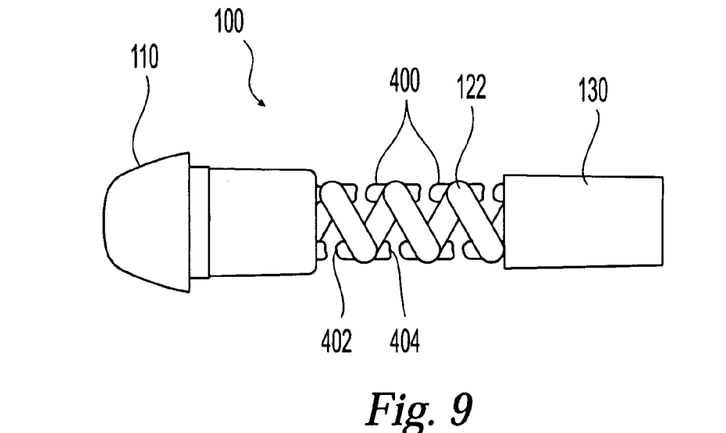
FIG. 9 is an elevational view of a second end plug formed in accordance with the principles of the present invention in an uncompressed state.
Figure 10:
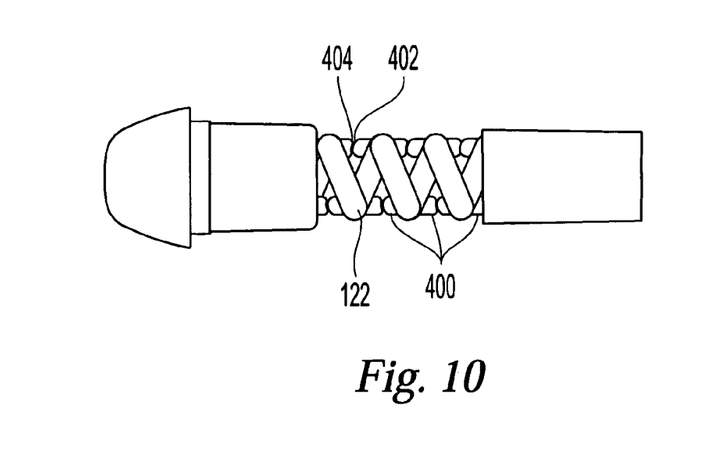
FIG. 10 is an elevational view of the end plug of FIG. 9 in a compressed state.

In another preferred embodiment, cushioning element 120 further comprises travel-limiting projections 400, shown in FIGS. 9 and 10, which limit the amount of compression that cushioning element 120 can undertake. The travel limiting projections 400 prevent over-compression of cushioning element 120, which may lead to breakage or undesired permanent deformation of cushioning element 120, particularly if cushioning element 120 is formed of a material (such as plastic) that can take a set or otherwise can deform. Each travel-limiting projection 400 has a distal end 402 and a proximal end 404. Distal end 402 preferably is slightly concave, while proximal end 404 preferably is slightly convex (although the reverse configuration is acceptable, as well as other configurations or no curvature at either end). Once cushioning element 120 is compressed to a certain length, distal end 402 of each travel-limiting projection 400 abuts proximal end 404 of the adjacent travel-limiting projection 400, preventing cushioning element 120 from being compressed further. This embodiment may also be formed using the injection molding process described above, with the addition of travel limiting projection cavities to mold halves 300 and 302.

Alternatively, in order to inhibit or to prevent bottoming out of the cushioning element, a stop element 500 may be provided. Stop element 500 preferably is formed separately from cushioning element. In the exemplary embodiment of FIGS. 11 and 12, stop element 500 is in the form of a stop pin extending through a longitudinal channel 502, 506 through cushioning element 120, end button 100, and collar 130. Stop element 500 preferably has an enlarged-diameter end or head 510 at distal end 512 sized to abut proximal end 50 of cartridge 40. Enlarged-diameter end 510 also may be configured to abut shoulder 514 within collar 130 to limit the distance stop element 500 can be inserted through longitudinal channel 502, 506 for reasons that will become apparent. Stop element 500 is configured so that stop element 500 does not affect compression of cushioning element 120 at the beginning of compression of cushioning element 120. However, when cushioning element 120 is compressed a predetermined amount, stop element 500 becomes effective and inhibits or prevents further compression of cushioning element 120.

Figure 11:
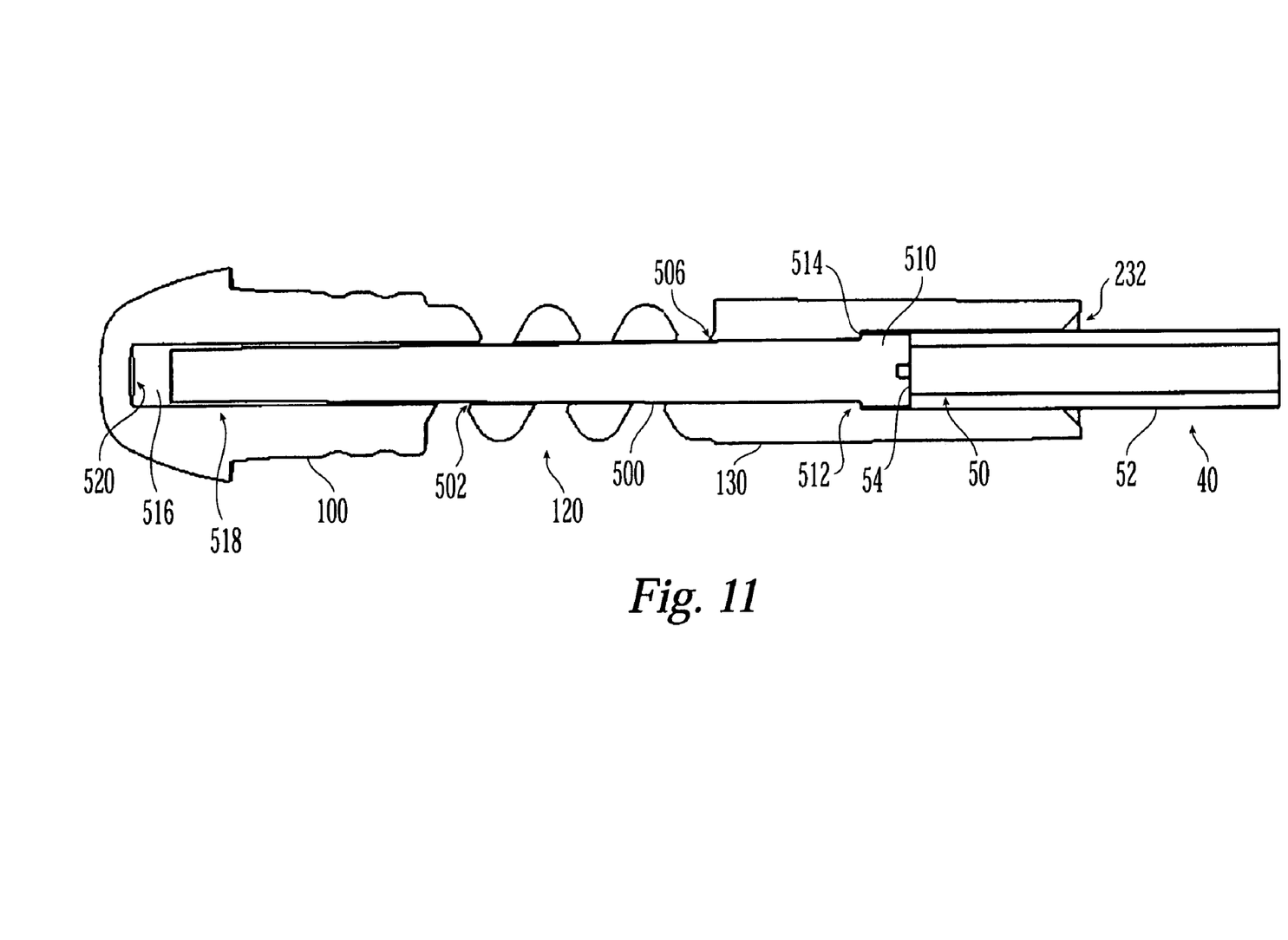
FIG. 11 is a cross-sectional view of an exemplary cushioning element with an exemplary stop element.
Figure 12:
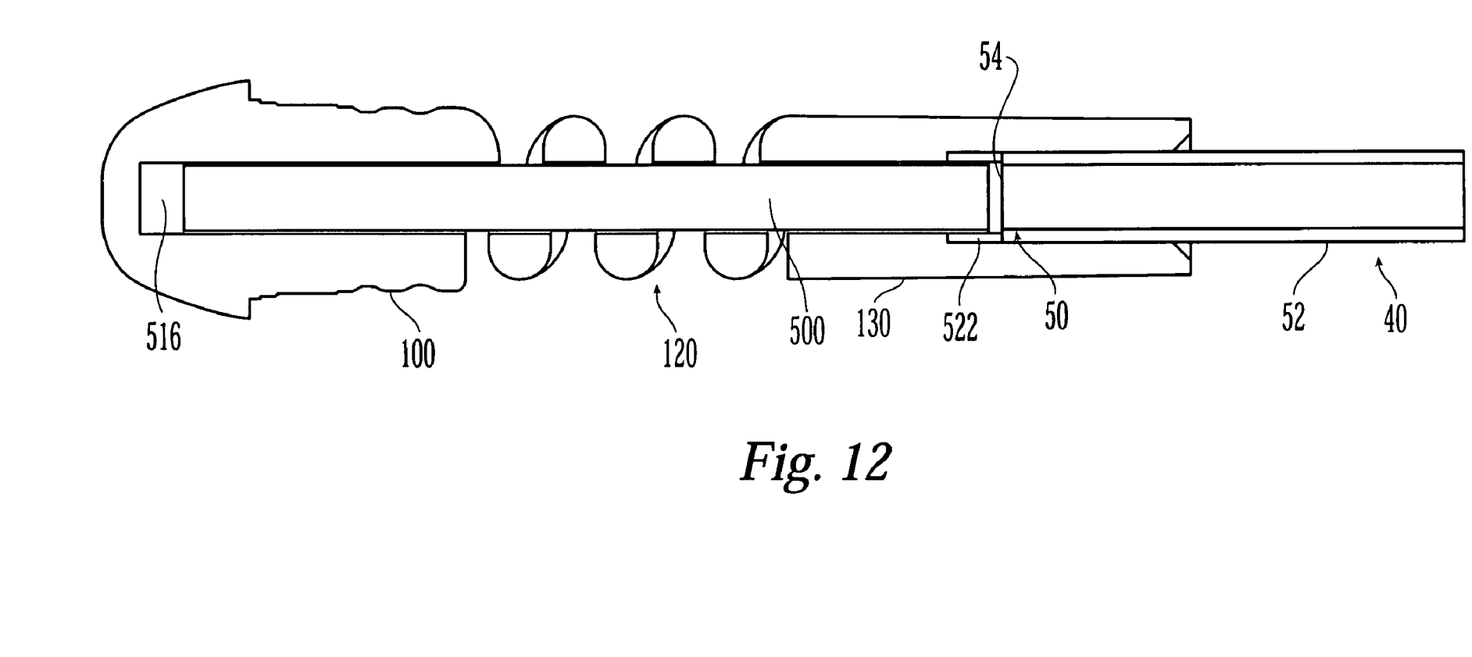
FIG. 12 is a cross-section of the exemplary cushioning element and stop element of FIG. 11 rotated 90°.

In the embodiment of FIGS. 11 and 12, stop element 500 is effective only after a predetermined amount of compression of cushioning element 120 by being effectively shorter than cushioning element 120 when cushioning element 120 is in an uncompressed state. Thus, when the length of cushioning element 120 shortens to be substantially equal to the length of stop element 500, stop element 500 can affect further compression of cushioning element 120. The difference in length between stop element 500 and cushioning element 120 thus determines the duration or degree to which cushioning element 120 is effective before being influenced or affected by stop element 500. The difference in length is selected based on a number of factors known to those of ordinary skill in the art, such as the spring constant, material, and/or configuration of cushioning element 120. The degree or extent to which stop element 500 affects the functioning of cushioning element 120 may be determined based on subjective user preferences. Thus, if a writing instrument 10 with very little cushioning is desired, then stop element 500 may be formed to affect cushioning element 120 very quickly after compressing cushioning element 120. With reference to the embodiment of FIGS. 11 and 12, to achieve very little cushioning, the difference in length between stop element 500 and cushioning element 120 is minimal. Another factor in determining the degree or extent to which stop element 500 affects the functioning of cushioning element 120 may be the yield point of the spring. In particular, stop element 500 may be selected and configured to interact with cushioning element 120 to prevent the yield point of cushioning element 120 from being exceeded.

In the embodiment of FIGS. 11 and 12, actuation of stop element 500 is achieved by leaving a gap 516 in end button 100 between proximal end 518 of stop element 500 and closed end 520 of channel 506 within collar 130 when cushioning element 120 is in an uncompressed, neutral, rest position (i.e., not actuated by pressing cartridge 40 against a substrate). Enlarged-diameter end 510 of stop element 500 abuts shoulder 514, as noted above, to prevent proximal end 518 from abutting closed end 520 of channel 506 when cushioning element 120 is not activated (e.g., not compressed). Gap 516 permits compression of cushioning element 120 a given extent before cushioning element 120 is compressed to the length of stop element 500. Once cushioning element 120 is compressed a predetermined extent, proximal end 518 of stop element 500 contacts closed end 520 of channel 506 within collar 130 to inhibit or to prevent further compression of cushioning element 120.

The dimensions and materials of cushioning element 120, stop element 500, and gap 514 are selected to achieve the desired range of compressibility of cushioning element 120 before bottoming out (i.e., before compressibility of cushioning element 120 is affected by stop element 500). In one embodiment, gap 516 is approximately 1 mm in length. Because selection of the length of gap 516 affects the degree or extent to which stop element 500 affects the functioning of cushioning element 120, such selection may be based on user preference and/or engineering aspects, as described above generally with respect to determination of the affect of stop element 500 on cushioning element 120. If stop element 500 is formed from a relatively rigid material, then once proximal end 518 of stop element 500 contacts closed end 520 of channel 506, further compression of cushioning element 120 is essentially prevented. However, stop element 500 may be formed from a material that has some degree of resiliency so that further compression of cushioning element 120 is possible even after proximal end 518 of stop element 500 contacts closed end 520 of channel 506. For instance, stop element 500 may be formed from a resilient or compressible or elastomeric or elastomeric-like material, such as rubber or thermoplastic elastomers or foams. Of course, if very little further compression is desired once stop element 500 becomes effective, then stop element 500 may be formed form a non-resilient or non-elastomeric material, such as a ferrous or ceramic material.

As noted above, proximal end 50 of writing medium reservoir 52 may be provided with opening 54 to allow venting for writing medium reservoir 52. Thus, if proximal end 50 of writing medium reservoir 52 abuts stop element 500, then stop element 500 preferably is configured to permit venting as well. As illustrated in FIG. 12, flats 522 may be formed in enlarged-diameter end 510 of stop element 500. Thus, venting of writing medium reservoir 52 may also occur through stop element 500.

According to one aspect of the present invention, in the exemplary writing instrument described herein, cushioning element 120 and end plug 100 preferably are formed integrally with each other. During the formation of an integrally formed end plug 100 with cushioning element 120, at least one is formed of a moldable material. Thus, cushioning element 120 and end plug 100 are inseparable and act as one element once the formation process is complete, requiring no further assembly or attachment to each other before use in assembling the writing instrument.

In some instances, it may be desirable to have a cushioning element formed of a different material than that of the end plug. The present invention may be practiced by forming an end plug with a cushioning element formed integrally, wherein the cushioning element is formed from a different material from the material of the end plug. For example, in another preferred embodiment, end plug 100 may be formed from a thermoplastic such as SAN, with a cushioning element 120 formed from a different moldable material, by a two-part molding process, such as a "two-shot" or "overmolding" process, both of which are well known in the art. The cushioning element 120 may also be made of a non-moldable material, such as a metal, and formed integrally with end plug 100 by an insert molding or overmolding process. After the formation of end plug 100 and cushioning element 120, end plug 100 and cushioning element 120 are inseparable and act as one element, requiring no further assembly or attachment to each other before use in assembling writing instrument 10. In another preferred embodiment, end plug 100 is made of a non-moldable material, and is formed integrally with cushioning element 120, cushioning element 120 being made of a moldable material.

Other additional features can be added to writing instrument 10 without departing from the spirit and scope of the present invention. For instance, in a preferred embodiment, gripping element 210 is added to barrel 12, aiding the user in gripping writing instrument 10. Also, cap 220 can be provided to cover distal writing end 22 and writing tip 42 when not in use. However, such additional features, while desirable, are not necessary to practice the present invention.

The present invention is not limited to only the preferred embodiments and means of assembly described above. For example, the cushioning element of the present invention may be formed integrally with a different element of the writing instrument 10, such as a barrel 12 or a front nose cone, instead of end plug 100 as described in the above preferred embodiment. Other embodiments of the present invention may use a cushioning element that is stretched during writing, rather than compressed as described in the above preferred embodiment. As another example, other embodiments of writing instrument 10 may be assembled by inserting cartridge 40 through the distal end 20 of barrel 12, such as for embodiments with a detachable front nose cone.

It will be appreciated that these features are separate and independent aspects of the present invention, each, at least alone, having unique benefits which are desirable for, yet not critical to, the present invention. It will also be appreciated that features described with respect to one embodiment typically may be applied to another embodiment, whether or not explicitly indicated. The various features described herein may be used singly or in any combination thereof. Therefore, the present invention is not limited to only the embodiments specifically described herein.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A writing instrument comprising:
    a barrel having a proximal end with a proximal opening and distal end with a writing end opening opposite said proximal end;
    a writing medium cartridge positioned in said barrel and having a writing tip extending out said writing end opening and a proximal end; and
    an end plug in said proximal opening; and a cushioning element formed integrally and as a single piece with said end plug;
wherein said cushioning element abuts said proximal end of said writing medium cartridge, and
wherein said end plug is attached to said proximal opening of said barrel by an adjustable threaded attachment.

2. The writing instrument of claim 1, wherein said end plug is attached to said barrel.

3. The writing instrument of claim 2, wherein said end plug is permanently attached to said proximal opening of said barrel.

4. A writing instrument comprising:
a barrel having a proximal end with a proximal opening and distal end with a writing end opening opposite said proximal end;
a writing medium cartridge positioned in said barrel and having a writing tip extending out said writing end opening and a proximal end;
an end plug in said proximal opening; and
a cushioning element formed integrally and as a single piece with said end plug;
wherein said cushioning element abuts said proximal end of said writing medium cartridge, and
wherein said end plug is ultrasonically welded to said proximal opening.

5. The writing instrument of claim 1, wherein said cushioning element is spring-shaped.

6. The writing instrument of claim 1, wherein said cushioning element holds said cartridge.

7. The writing instrument of claim 1, wherein said cushioning element further comprises a hole to allow venting.

8. A writing instrument comprising:
a barrel having a proximal end with a proximal opening and a distal end with a writing end opening;
a cartridge in said barrel having a writing tip extending out said writing end opening;
an end plug in said proximal opening; and
a cushioning element formed integrally with said end plug;
wherein said cartridge is held by said cushioning element, and
wherein said cushioning element is composed of a different material than the material of said end plug.

9. A writing instrument comprising:
a barrel having a proximal end and a distal end with a writing end opening;
a cartridge positioned in said barrel and having a writing tip extending out said writing end opening and a proximal end;
a cushioning element in the form of a coil spring abutting said cartridge and permitting axial movement of said cartridge within said barrel upon compression of said cushioning element by said cartridge during writing; and
a stop element extending through said cushioning element and affecting compression of said cushioning element once said cushioning element is compressed a predetermined extent of said cartridge, wherein said proximal end of said cartridge abuts said stop element.

10. The writing instrument of claim 9, wherein:
a proximal opening is defined in said proximal end of said barrel;
said writing instrument further comprises an end button positioned in said proximal opening in said barrel; and
said cushioning element is positioned between said end button and said proximal end of said cartridge.

11. The writing instrument of claim 10, wherein:
a longitudinal channel is defined in said end button and has a closed proximal end;
aid stop element extends through said longitudinal channel in said end button; and
a gap is left between said stop element and said closed proximal end of said longitudinal channel in said end button when said cushioning element is in a neutral position.

12. The writing instrument of claim 9, wherein said stop element is formed from a material that inhibits, but does not prevent, further compression of said cushioning element once said cushioning element is compressed to said predetermined extent.

13. The writing instrument of claim 9, wherein said stop element is formed from a material that prevents further compression of said cushioning element once said cushioning element is compressed to said predetermined extent.

14. The writing instrument of claim 9, wherein said stop element is slidably positioned within said cushioning element.

15. The writing instrument comprising:
a barrel having a proximal end and a distal end with a writing end opening;
a cartridge positioned in said barrel and having a writing tip extending out said writing end opening and a proximal end;
a cushion element in the form of a coil spring abutting said cartridge and permitting axial movement of said cartridge within said barrel upon compression of said cushioning element by said cartridge during writing; and
a stop element extending through said cushioning element and affecting compression of said cushioning element once said cushioning element is compressed a predetermined extent of said cartridge;
wherein;
a proximal opening is defined in said proximal end of said barrel;
said writing instrument further comprises an end button positioned in said proximal opening in said barrel;
a longitudinal channel is defined in said end button and has a closed proximal end;
said stop element extends through said longitudinal channel in said end button;
said cushioning element is positioned between said end button and said proximal end of said cartridge; and
a gap is left between said stop element and said closed proximal end of said longitudinal channel.

16. A writing instrument comprising:
a barrel having a proximal end and a distal end with a writing end opening;
a cartridge positioned in said barrel and having a writing tip extending out said writing end opening and a proximal end;
a cushioning element in the form of a coil spring abutting said cartridge and permitting axial movement of said cartridge within said barrel upon compression of said cushioning element by said cartridge during writing; and
a stop element extending through said cushioning element and affecting compression of said cushioning element once said cushioning element is compressed a predetermined extent of said cartridge;
wherein said stop element is formed from a material that inhibits, but does not prevent, further compression of said cushioning element once said cushioning element is compressed to said predetermined extent.

* * * * *